US012122286B2

(12) United States Patent
Santa Cruz Ungson

(10) Patent No.: US 12,122,286 B2
(45) Date of Patent: Oct. 22, 2024

(54) DEPLOYABLE RACK FOR LOADING AND TRANSPORTATION OF FLAT GLASS

(71) Applicant: Daniel Santa Cruz Ungson, Mexicali (MX)

(72) Inventor: Daniel Santa Cruz Ungson, Mexicali (MX)

( * ) Notice: Subject to any disclaimer, the term of this patent is extended or adjusted under 35 U.S.C. 154(b) by 618 days.

(21) Appl. No.: 17/417,014

(22) PCT Filed: Feb. 12, 2021

(86) PCT No.: PCT/MX2021/050008
§ 371 (c)(1),
(2) Date: Jun. 21, 2021

(87) PCT Pub. No.: WO2022/093000
PCT Pub. Date: May 5, 2022

(65) Prior Publication Data
US 2023/0033845 A1    Feb. 2, 2023

(30) Foreign Application Priority Data

Oct. 30, 2020  (MX) .................... MX/a/2020/011603

(51) Int. Cl.
*B60P 3/42*      (2006.01)
*B60P 3/00*      (2006.01)

(52) U.S. Cl.
CPC ................. *B60P 3/42* (2013.01); *B60P 3/002* (2013.01)

(58) Field of Classification Search
CPC .... B60P 3/002; B60P 3/42; B60P 1/02; B65D 19/44; B65D 88/12; B65D 85/48; B65G 49/06

(Continued)

(56) References Cited

U.S. PATENT DOCUMENTS 5,209,540 A    5/1993  Metler
6,705,823 B2   3/2004  Bohata
(Continued)

FOREIGN PATENT DOCUMENTS

CN    202226255 U       5/2012
CN    107380635 A   *  11/2017  ............. B65D 19/44
(Continued)

OTHER PUBLICATIONS

International Searching Authority; International Search Report; International Application No. PCT/MX2021/050008; May 24, 2021; 4 pages.

*Primary Examiner* — Amy R Weisberg
*Assistant Examiner* — Veronica M Shull
(74) *Attorney, Agent, or Firm* — Bridget A. Cochran; Cochran Freund & Young LLC

(57) ABSTRACT

A deployable rack platform for loading and transportation of flat glass comprising a system allowing the rack platform to turn from a horizontal position, being totally flat, to a different position featuring diverse opening angles within a vehicle chassis. Particularly, a deployable rack for loading and transportation of flat glass wherein the rack platform achieves a horizontal position within a maximum period of 5 minutes, enabling the platform to take advantage up to 100% of the original surface of the platform initial position (e.g., before loading flat glass) wherein the process does not require the transportation of flat sheets or where the proceed needs to be loaded with different goods, merchandise, or raw materials. The rack platform comprises a highly versatile system for different types of transportation by optimizing space and savings, since the platform supports a load up to 20 tons.

5 Claims, 21 Drawing Sheets

(58) Field of Classification Search
USPC .................. 296/3; 211/41.14, 41.15; 410/32; 414/608
See application file for complete search history.

(56) References Cited

U.S. PATENT DOCUMENTS

| | | | | |
|---|---|---|---|---|
| 7,510,091 | B2* | 3/2009 | Sollers | ............... B65D 19/0002 |
| | | | | 211/41.14 |
| 8,789,710 | B1* | 7/2014 | Moore | ...................... B62B 1/20 |
| | | | | 211/41.14 |
| 9,327,632 | B1 | 5/2016 | Bartel | |
| 10,518,688 | B2* | 12/2019 | Vander Pol | ............ B62D 33/02 |
| 11,208,026 | B2* | 12/2021 | Beldrighi | ................ B60P 1/165 |
| 11,787,622 | B2* | 10/2023 | Peters | .................... B65D 85/48 |
| | | | | 193/35 SS |
| 2007/0272633 | A1* | 11/2007 | Gardner | ............... B65D 88/129 |
| | | | | 211/41.15 |
| 2008/0152453 | A1* | 6/2008 | Mix | ..................... B65G 49/062 |
| | | | | 410/32 |
| 2011/0138666 | A1* | 6/2011 | Borde | .................... A47G 1/166 |
| | | | | 40/747 |

FOREIGN PATENT DOCUMENTS

| | | | |
|---|---|---|---|
| DE | 102010060273 | A1 | 5/2012 |
| EP | 0054008 | A1 | 6/1982 |
| EP | 1745980 | A1 | 1/2007 |
| ES | 2403542 | A1 | 11/2011 |
| FR | 2289400 | A1 | 5/1976 |
| KR | 101841074 | B1 * | 3/2018 |

\* cited by examiner

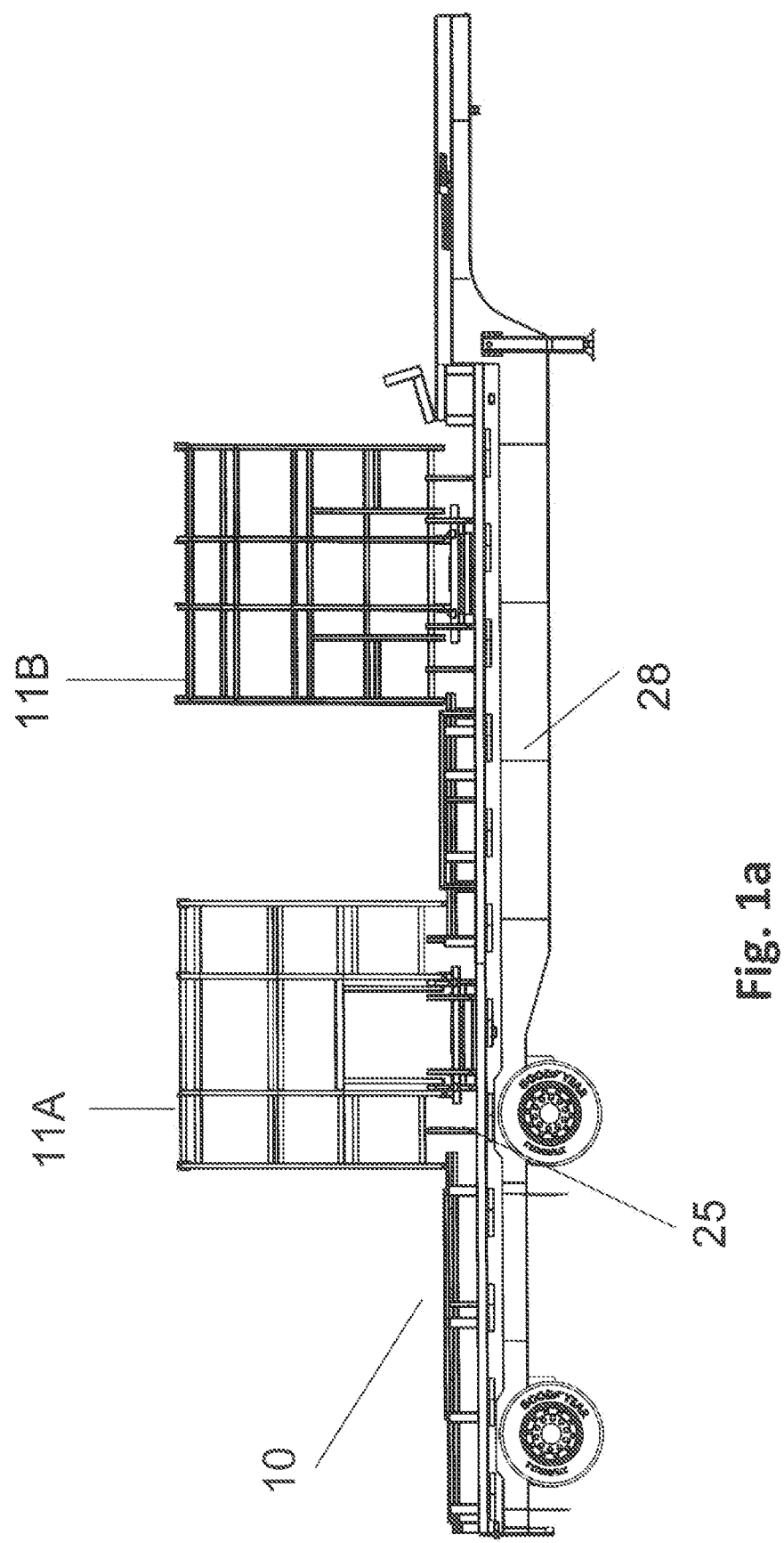

DEPLOYABLE RACK FOR LOADING AND TRANSPORTATION OF FLAT GLASS

TECHNICAL FIELD

The present disclosure relates to a deployable rack platform located on the chassis of a vehicle and more particularly, the disclosure relates to a deployable rack comprising a rack platform for loading and transporting flat glass wherein the main advantage is referred to a rack platform embracing a system allowing the rack platform to turn from a horizontal position, being totally flat, to a different position featuring diverse opening angles within a maximum period of 5 minutes, enabling the platform to take advantage up to 100% of the original surface of the rack platform initial position (e.g. before loading flat glass) or when the process does not require the transportation of flat sheets or need to be loaded with different goods, merchandise or raw materials. The rack platform comprises a highly versatile system for different types of transportation by optimizing the area and savings, since the platform supports a material load up to 20 tons.

BACKGROUND

Diverse prior art anticipates transportation systems and the efficiency related to the transportation of glass panels such as EP 0 054 008 A1 which describes a combination of a transportation vehicle and a removable rack for transporting sheets, wherein large panels, or panels of flat glass (L) are transported on a semi-trailer and supported on a rack. The system is so designed that its base slides into a channel formed in the chassis of the semi-trailer. Each side of the rack consists of several uprights pivoted to the base and to a common top longitudinal member. When carrying panels etc., the rack is locked by insertion of several horizontal frames. When required to carry a load other than panels, the horizontal frames are removed, and the rack is folded into the channel. However, the patent does not imply that the rack is supported on an open transport loading platform, resting on the chassis of a transportation vehicle. Thus, the versatility of this system refers to a manual handling.

U.S. Pat. No. 6,705,823 B2 A describes a vehicle for lifting and transporting a container which is loaded and unloaded from the rear of the vehicle. The vehicle includes a base assembly attached to the vehicle with a substantially L-shaped boom pivotably attached to the base assembly. The substantially L-shaped boom has two segments connected to one another with a first segment being pivotably attached to the left side or the base assembly and the second segment being pivotably attached to the right side of the base assembly. Each of the two segments has an upper portion and a lower portion with the lower portions being at an obtuse angle of over 90° to approximately 140° relative to the upper portions. The pivotable attachment of the boom being attached to the lower portion of each of the segments to the base assembly, so that upon pivoting the boom, the upper portion of each of the two segments is pivoted from a substantially vertical position to a substantially horizontal position during a loading procedure. A lift assembly is pivotably attached to the boom for rearward loading and unloading of a container from the vehicle. The lift assembly includes a lifting element for pivoting the lift assembly relative to the boom. However, even if this patent has an efficient platform, the system does not disclose an entirely flat platform.

ES 2403542 A1 describes a deployable support for transporting glass associated with a loading platform, comprising a pair of elements (3) forming an "A" which remain rotatably connected to the base of the loading platform (1); comprising an upright position related to a central opening (8) of a stringer (9), on which the glass sheets settle comprises the base of the platform (1); an emptying (6) of a pair of elements (3) forming an "A" comprising the front wall (7) of the platform body (1) by external faced of a curved-convex configuration defining an area (23) for the location of the stringers (9), crossbars (5) and other disassembled components of the support, being able to be adapted to a multitude of trucks, trailers and semi-trailers for freight transport. This patent lacks support referred to the displacement of the deployable racks to obtain a flat open loading platform. The patent only describes the first and second sets of axles, which are attached to the bottom of the chassis of vehicles for distributing the weight between the vehicles.

DE 102011057043 B4, describes a rack with a multi-axle chassis for transporting, depositing and picking up goods, comprising a loading platform (2) arranged in a rear area of the chassis (1), which has a toothed ring (43) for rotating the loading platform (2) in a vertical axis of rotation (44)—a loading area (3) at the same position as the loading platform (2), which is arranged in front of the direction (8) of the truck and with a longitudinally rollable loading system (22) for transporting goods (39) from the loading platform (2) equipped on the loading area (3) and vice versa, —a rack with two load arms articulated on the loading platform (2), horizontally pivotable comprising adjustable swivel cylinders and a crossbeam (6) attached to it for receiving goods (39), characterized in that—the pivotable load arms are designed as a telescopic boom (52) with a traverse (6), the traverse (6) being centered at a load hook (64), which is freely rotatably mounted to an axis orthogonal to the cross member (6), —a drive pinion (13) of a drive motor (14), which is rigidly attached to the chassis (1), in the ring gear (43) the loading platform (2) is arranged in a combing manner in order to rotate the loading platform (2) to the vertical axis of rotation (44), and—a chassis (1) close to the axis of rotation (44), below the loading platform (2) attached to the support device (16) being attached to stabilize the chassis (1) in the loading platform area (2) when loading and unloading the goods (39), the support device (16) being transversely to the direction of travel (8) extendable. The patent describes a loading platform that has a toothed ring rotating said platform. However, such platform does not comprise a rack with deployable sections to form an open transport loading platform.

U.S. Pat. No. 9,327,632 B1 describes a vehicle that includes a vehicle frame, a plurality of wheels and a cargo bed assembly. A cargo bed translation mechanism is operable between the vehicle frame and the cargo bed to translate the cargo bed between a range of positions including a first transport position, a plurality of raised position a variety of loading positions. A cargo bed dumping mechanism is operable for tipping the cargo bed to dump the contents of the cargo bed at least from the transport position and the raised positions. However, the document does not describe an inverted V-shaped rack structure that in a first movement rotates in such a way that it turns perpendicular to an open loading platform, and in a second movement, said platform can be deployed on the chassis of the vehicle, furthermore, said patent does not describe a rack for folding surfaces or for loading attachments that distribute the weight of the platform.

SUMMARY OF THE INVENTION

Common deployable racks for flat glass transportation are characterized by being affixed to a chassis forming an inverted "V" or "A" shape. Frequently, such deployable racks are permanently located on a vehicle chassis platform or open load platforms, since its use is exclusively for transporting glass on vehicles comprising a chassis with more than two axles, taking no advantage of the platforms area when the racks are not transporting flat glass sheets. Since common racks are fixed, it is difficult to use the full area of the chassis since deployable racks use a considerable area from the chassis. Thus, the functional area for transporting goods, merchandise or raw material is considerable reduced. In view of above, those devices involve an increase in transportation costs since such vehicles can only be used for transporting flat sheets.

The present disclosure provides a solution by always using the full area of a chassis through a deployable rack that preserves its mechanical and physical features by operating in "open mode" "A Shape", or "storage mode" when being deployed and taking advantage of its maximum storage capacity, reducing transportation costs by transporting flat glass, metal sheets, plywood, or lumber, and increasing revenues for transportation companies.

The present disclosure provides novel and inventive features from such reported in the state of the art, among the most highlighted features are emphasized those providing novel features among those reported in the state of the art.

In one preferred embodiment, the proposed rack system provides two physical operational phases: "storage mode" and "open mode" by means of a novel operational system allowing the first operational phase "storage mode" to comprise a full flat platform (first operation phase) parallel to the chassis floor, enabling the transportation of any goods, merchandise, or raw materials as a first operational phase in an open platform. Furthermore, the system also comprises a second operational phase "open mode" allowing the transportation of flat glass, metal sheets, plywood, or lumber. The "Open mode" comprises a rack forming an inverted "V" shape. In either phase, the system has a load capacity up to 20 Tons and achieves the turning from "storage mode" to "open mode" within in a maximum period of 5 minutes by means of the following technical elements:

basal frame, comprising a security feature for cushioning and securing the "storage mode".
Turn point of the turning transfer cart.
Extendable fastening and securing means on each side of the deployable rack to fasten the glass sheets on the support walls.

Such technical elements allow the invention to provide a deployable rack for flat glass transportation, featuring a novel design comprising two operational phases being totally horizontal (storage mode-1) and (open mode-2) for loading and transportation purposes. The first phase (storage mode-1) allows the load and transportation of several goods and material. The second phase (open mode-2), comprises a deployable rack which is perpendicular to the inverted V-shaped platform for loading and transportation of flat glass, metal sheets, plywood, or lumber, in a safe and efficient way, comprising:

i) a basal frame comprising longitudinal and transverse rails being longitudinally arranged on the chassis platform of the vehicle and operating as a first fixed basal load platform whose arrangement makes it possible to adapt a second turning platform. (turning transfer cart).

ii) A turning transfer cart or turning platform, comprising a platform embedded in a distal region of the basal frame whose arrangement allows a 90-degree turn on its axis in order to achieve a transverse position in relation with the basal frame. The rack sheets for transporting flat glass are located above this platform.

The deployable rack phases are achieved as follow:

The first phase (storage mode-1) starts when the turning transfer cart containing the turning point in its center and fastening the deployable rack forming an "A" shape (being located in the distal part of the rack) performs a 90 degree turn on its axis in a counterclockwise direction, allowing the attachment and alignment of the central rails of the turning platform with the central rails of the frame. The turning transfer cart is in a transverse position with the basal frame. Furthermore, the sliding rollers may slide in a single way along the central rails of the turning transfer cart and the central rails of the basal frame. Additionally, the two sheets (panels) of the deployable rack in an unfolded position are joined by union hinges widening the opening angle by translating one of the sheets along the basal frame longitudinal rails, until the sheets become completely flat and parallel to axis "y".

The second phase (open mode-2) refers to the phase wherein the rack sheets form an inverted "V" shape, achieving a counterpart operation to the first phase (storage-1) and wherein the rack panels close their angle until achieving a safe inclination of each sheet as desired by the operator. Furthermore, the turning transfer cart performs a 90-degree turn on its axis in a clockwise direction in order to achieve a transverse position to the basal frame. In order to hold the open mode, removable support components forming an inverted "A" shape are used. This second phase secures the loading of material and the correct rack angle by means of deployable devices in form of an inverted "horseshoe shaped" form, being located on edges and along the deployable rack due the basal frame configuration. Furthermore, the panel sheets can be located and secured as desired by the operator. Then, the loading of flat material starts, e.g., flat glass, metal sheets or lumber.

The phases (1 and 2) are achieved by means of a manual or automatic mechanism, wherein the arrangement of the basal frame rails and the turning transfer cart are perfectly adjusted to stop their movement once the counterpart rails of both platforms are aligned and/or in a transverse position from each other, within a period no longer than 5 minutes.

Additionally, the invention comprises elements such as union hinges for panels and sliding rollers running along the platform in order to achieve the operational phases.

Furthermore, the invention discloses extendible fastening devices in each side of the rack, in order to fasten glass sheets to the support walls of the deployable rack, preventing movement during their transportation.

BRIEF DESCRIPTION OF THE DRAWINGS

A full and enabling disclosure of the present invention, including the best mode thereof, directed to one of ordinary skill in the art, is set forth in the specification, which refers to the appended figures, in which:

FIG. 1a illustrates a perspective view of one embodiment of the deployable rack for loading and transporting flat sheets in an open mode (phase-2) within a loading platform, wherein each panel constitute the deployable rack comprising a cut-off or flat shape.

DETAILED DESCRIPTION

Figure 1B:
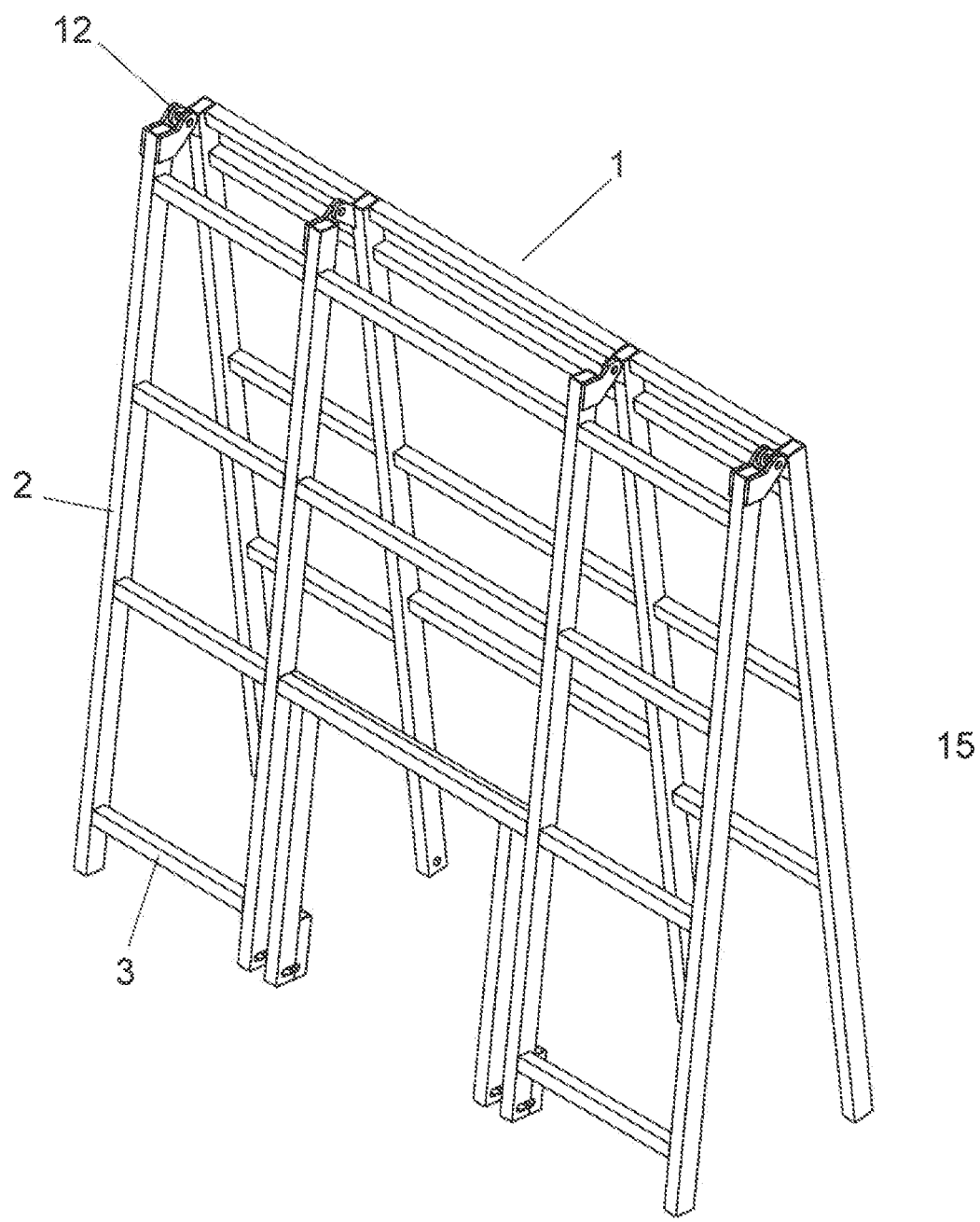
FIG. 1b illustrates a perspective view of the internal structure of the basal frame wherein the panels are attached.

The present disclosure relates generally to a versatile deployable rack that can achieve two phases (storage mode-1 and open mode-2) within a period of 5 minutes, for transporting flat glass but without restricting additional materials, allowing a load capacity up to 20 tons, and more particularly, the disclosure refers to a system, manufacturing method and use of the deployable rack. Preferably, the disclosure relates to the system versatility allowing the operation of two phases (storage mode-1 and open mode-2) employing the panels as featured by the deployable rack. In an additional embodiment, the disclosure enables persons skilled in the art to reproduce the invention. In another preferred embodiment, the disclosure relates to a method comprising two phases (storage mode-1 and open mode-2) and their manufacturing steps and use, without limiting the real scope of the invention or additional embodiments.

For clarity purposes, the following definitions are provided for the understanding and comprehension of the disclosure:

The open mode-2 as described herein, refers to a folded position wherein the rack panels form an "A" shape or an inverted "V" shape forming an opening angle.

The store mode-1 as described herein, refers to an unfolded position being totally horizontally flat after unfolding the internal structure of the deployable rack containing the rack panels, until achieving a rest position of the panels.

The basal frame as described herein, refers to a metallic structure comprising longitudinal and transverse rails being extended over the chassis platform area of a transportation vehicle.

The "transportation vehicle" as described herein, refers to any transport vehicle comprising one, two or more axles.

The "Flat glass" as described herein, refers to glass sheets, mirror, or metal sheets being bigger than one meter.

The 'Turning device', or "Turning transfer cart" as described herein, refers to the metallic structure with smaller dimensions than the basal frame embedded in a distal region of the basal frame. The turning transfer cart allows a 90-degree turn on its axis to achieve a transverse position with the basal frame and vice versa.

The "turning point" refers to the device located in the center of the turning transfer cart and which operates by manual, electrical, pneumatic and/or hydraulic forces activating a set of bearings, pins, gears, among others in order to achieve the turning force.

Reference now will be made in detail to the embodiments of the invention, one or more embodiments of which are illustrated in the drawings. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1a illustrates a deployable rack comprising two panels on the loading platform of a transportation vehicle, forming an inverted "V" shape, and being designed to load up to 20 tons. The panels are configured as:

a flat panel (11B) which is usually the panel that remains attached to the turning transfer cart (20), and a trimmed panel (11a), which is the panel that increases or decreases its angle. The trimmed panel has the advantage of being lighter during the opening and storage angles, as well as being adjusted to extension platforms having a flat floor, which are platforms supplementary to the deployable rack. These extension platforms may or may not be used, depending on the length of the chassis platform (10).

Furthermore, FIG. 1b illustrates the internal structure of panels forming an inverted "V" shape, wherein a union hinge (12) is arranged in the upper part of the panels mostly in the intersection point forming the "A" or "V" shape, and being a rigid and solid structure constituted by longitudinal (17) and transverse (20) rails that could be manufactured from several materials such as carbon steel, allied steel, aluminum and stainless steel; and in many forms such as tubular, channel, plate, among others forms. The panel sheets (11A and 11B) are attached to the internal structure of panels.

Figure 1C:
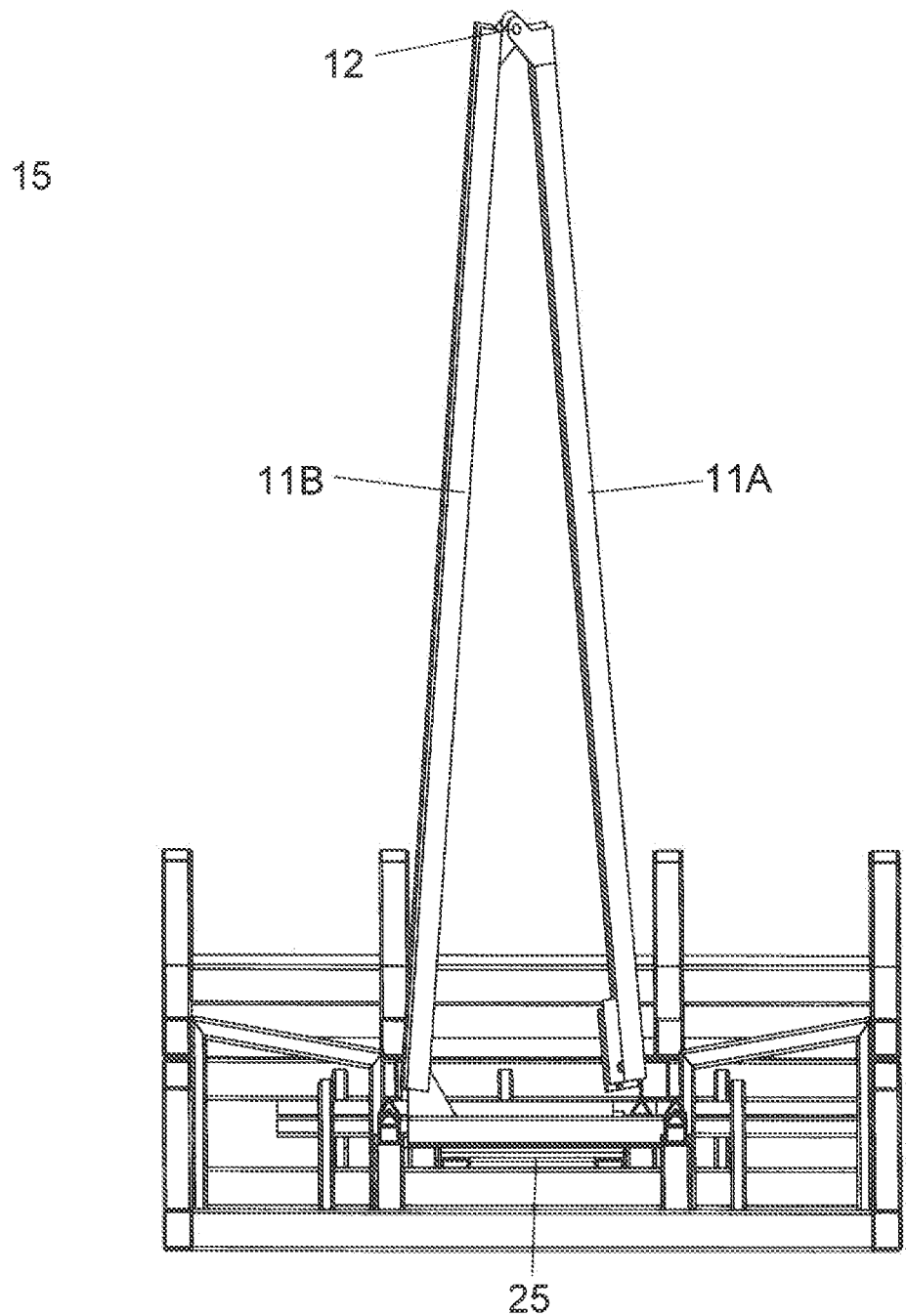
FIG. 1c illustrates a rear view of the vehicle chassis wherein the rack sheets form an "A" shape on the basal frame.

Referring now to FIG. 1c, it is illustrated the rear view of the vehicle platform wherein the deployable rack (1,15) is embedded forming an "A" shape disclosing an adjustable opening angle for both panels (11A, 11B) of the deployable rack (1). The panels (11A, 11b) are embedded using a union hinge (12) allowing both panels to be opened and closed (15). Furthermore, the deployable rack is embedded on the turning transfer cart (21), which is embedded in the basal frame (16).

The deployable rack (1,15) allows the load of materials to be supported mainly by removable support components (4) forming an "horseshoe-shaped" form that are comprised within the basal frame and being located along the lateral basal side of the deployed rack. As referred in FIG. 5a, the removable support components are distributed along the basal frame as desired by the operator, and their main purpose is to support the loading of glass in any distribution within the deployable rack. These removable devices only contribute to the operation when the deployable rack is in open mode forming an "A" shape or in a second operational mode.

Figure 7A:
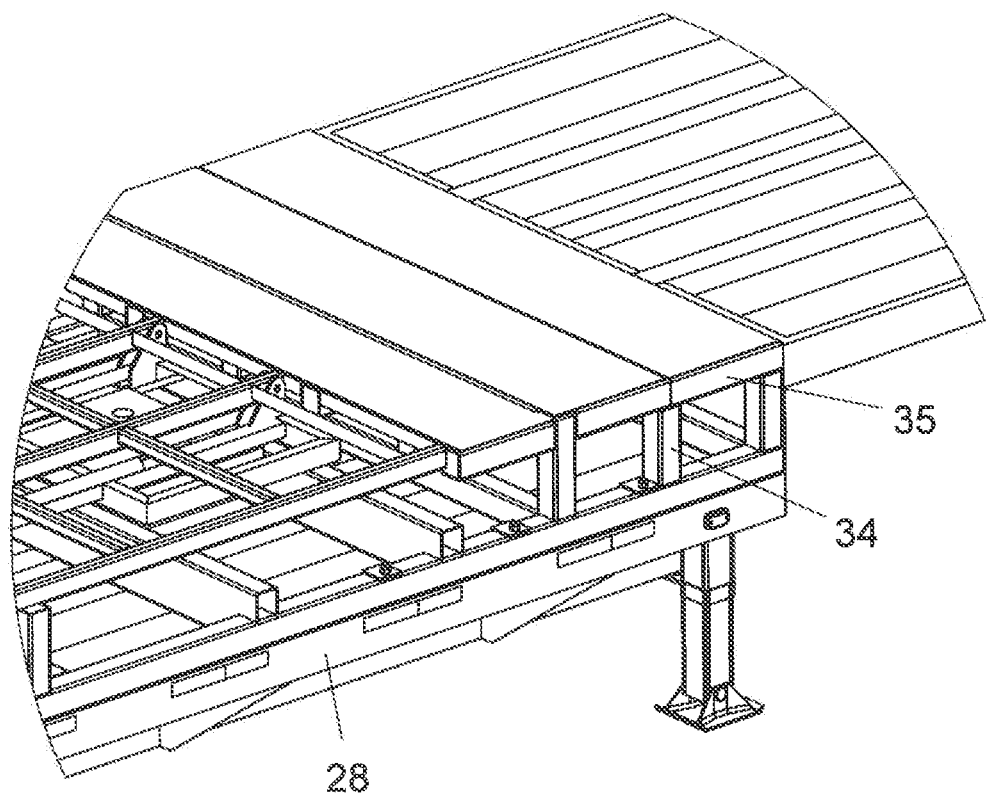
FIG. 7a, illustrates the elevated load areas.

As referred in FIG. 7a, the chassis platform while performing an open mode (14) comprises extension components for achieving a uniform area (13). The extension components fill the empty spaces when the folding rack is extended in order to reach a fully open platform, the design of this element ensures that the total area of the platform can be filled to achieve uniformity and ensuring that the platform can be loaded by different goods.

Figure 2A:
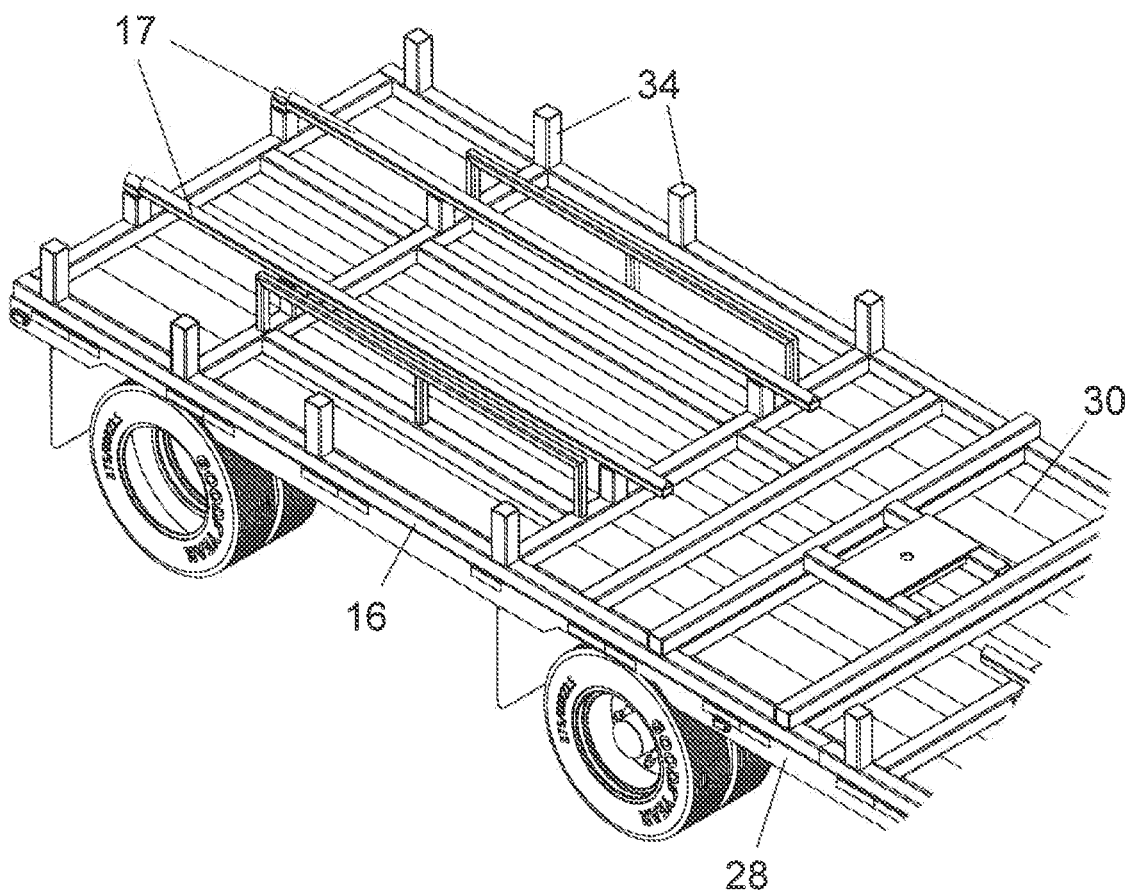
FIGS. 2a and 2b illustrate a perspective and rear view of the longitudinal rails of the basal frame.
Figure 2B:
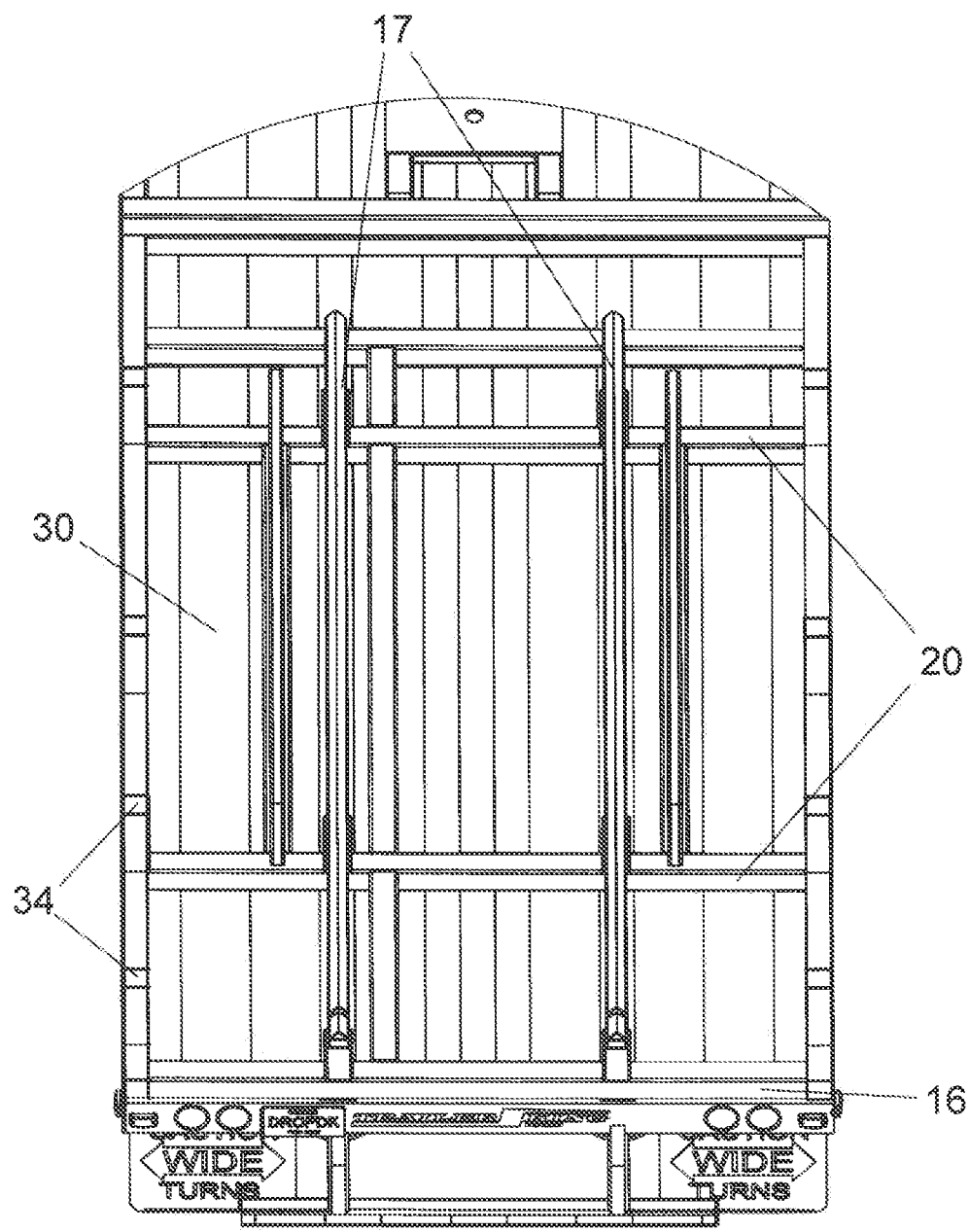
Figure 3:
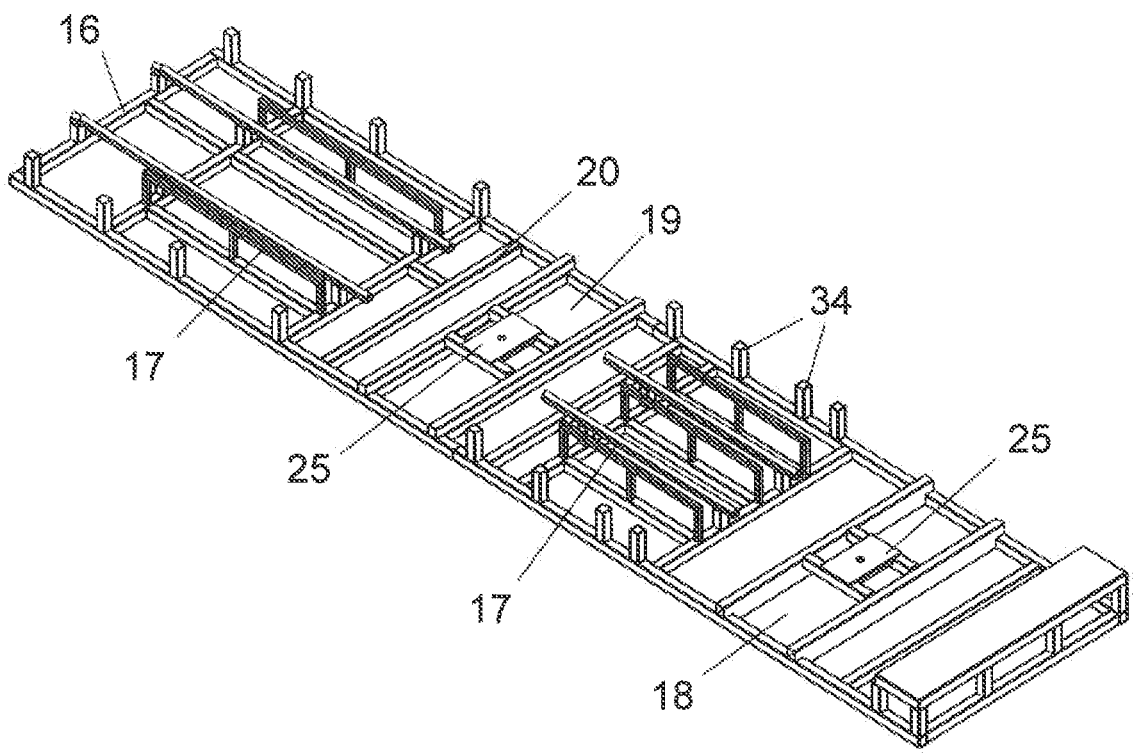
FIG. 3 illustrates the structure and design of the basal frame along with its comprising elements.

As referred in FIGS. 2a and 2b, the basal frame refers to a structure comprising longitudinal (17) and transverse (20) rails on the chassis platform (14). The longitudinal frame rails (17) guarantee the alignment and docking of the rack panels (11A and 11B) in storage and open mode. The rails could be manufactured from several materials such as carbon steel, allied steel, aluminum and stainless steel; and in many forms such as tubular, channel, plate, among others forms. The rails remain immovable to the platform (14).

Figure 4A:
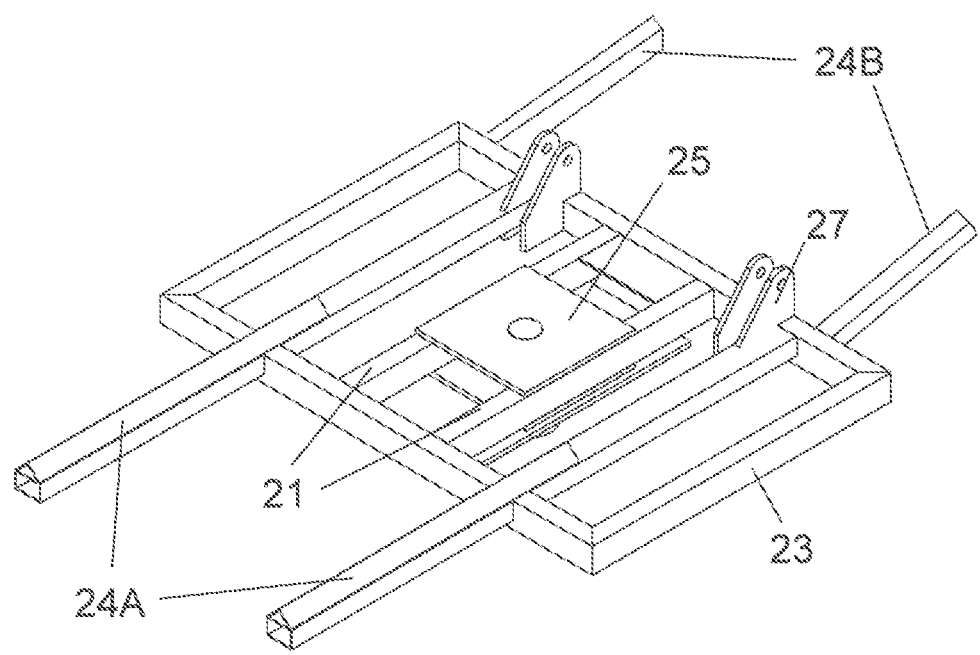
FIG. 4a illustrates a perspective view of the turning transfer cart along with its comprising elements.
Figure 4B:
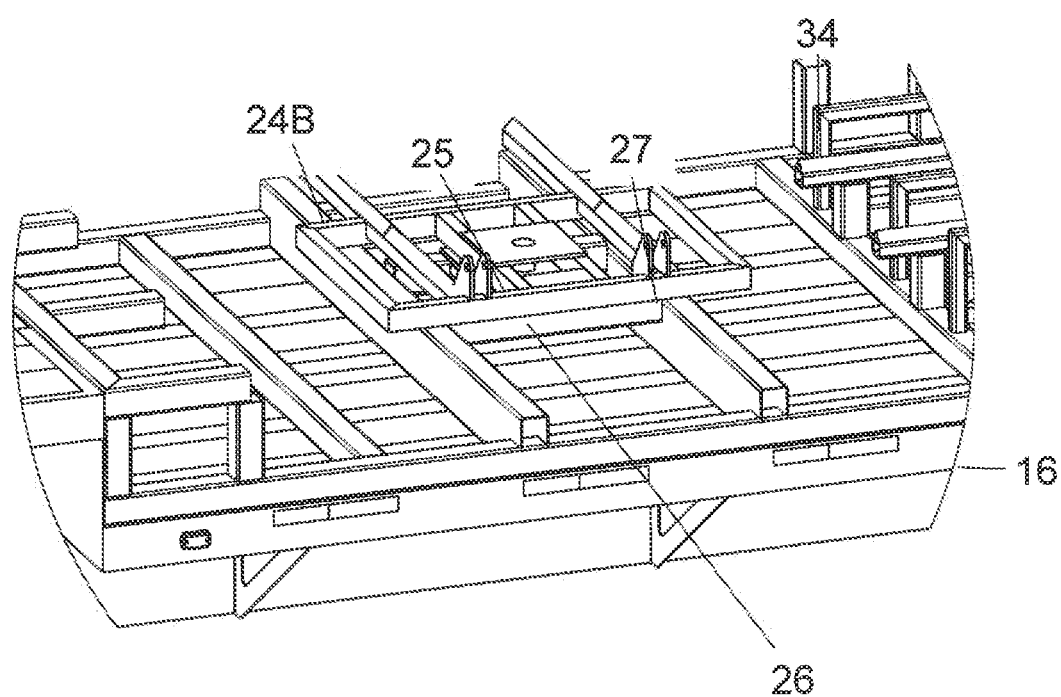
FIG. 4b illustrates a perspective view of the fragmented region of the recessed arrangement of the turning transfer cart in a distal region of the basal frame.

Furthermore, FIG. 4 refers to the turning platform (22) comprising a longitudinal (24a) and transverse rail structure which design is adapted to be embedded in either the proximal or distal region of the basal frame (18, 19). Additionally, the "tuning point" (25) is located in the center of the turning platform.

Figure 5A:
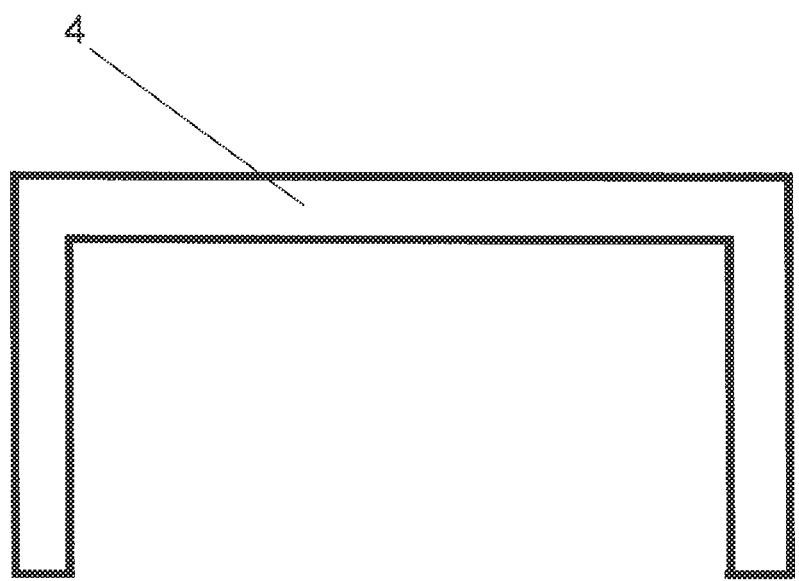
FIG. 5a illustrates a perspective view of the deployable devices forming an inverted "horseshoe-shaped" form in order to fasten the material load.
Figure 5B:
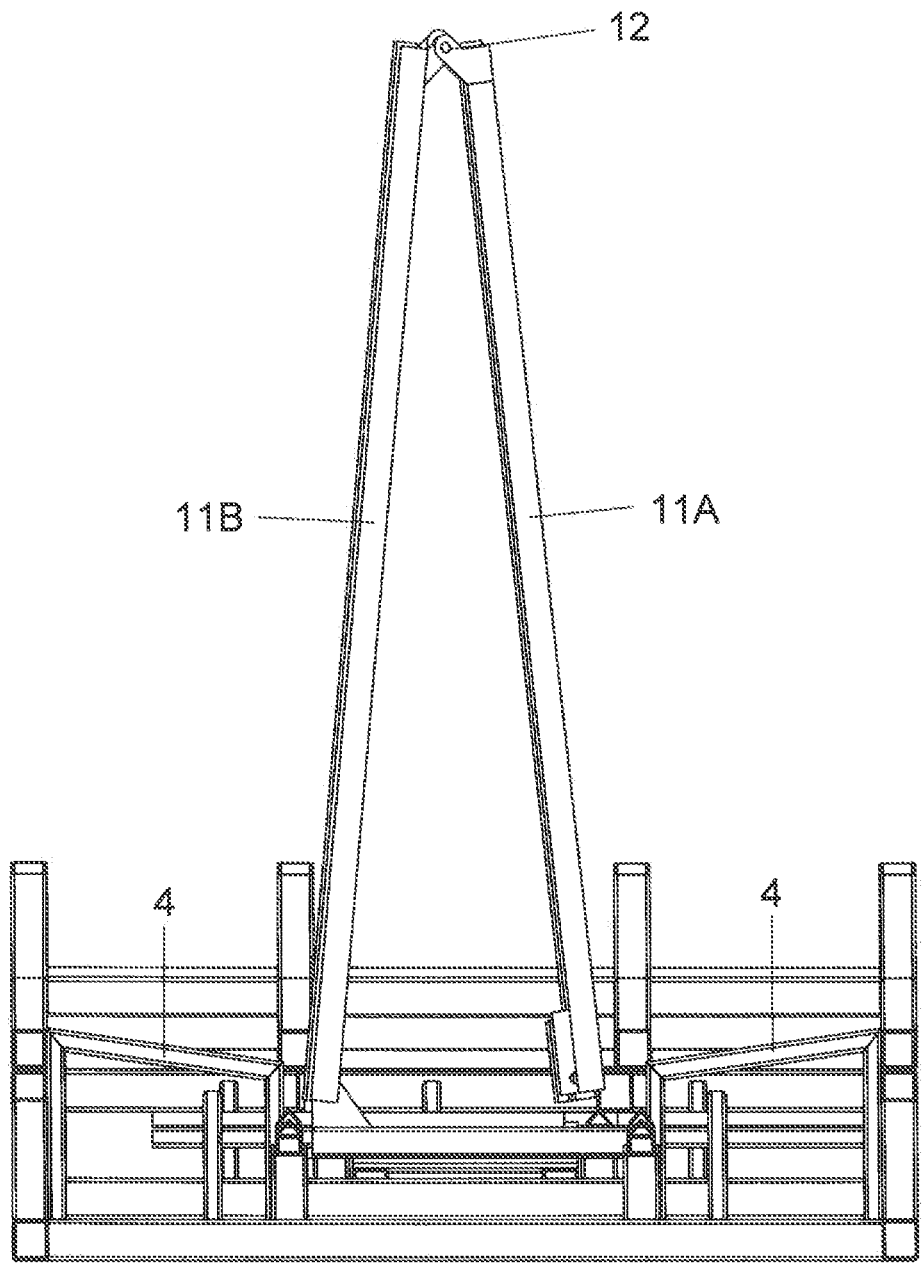
FIG. 5b illustrates a rear view of the deployable devices in the lateral basal region of the deployable rack.
Figure 6:
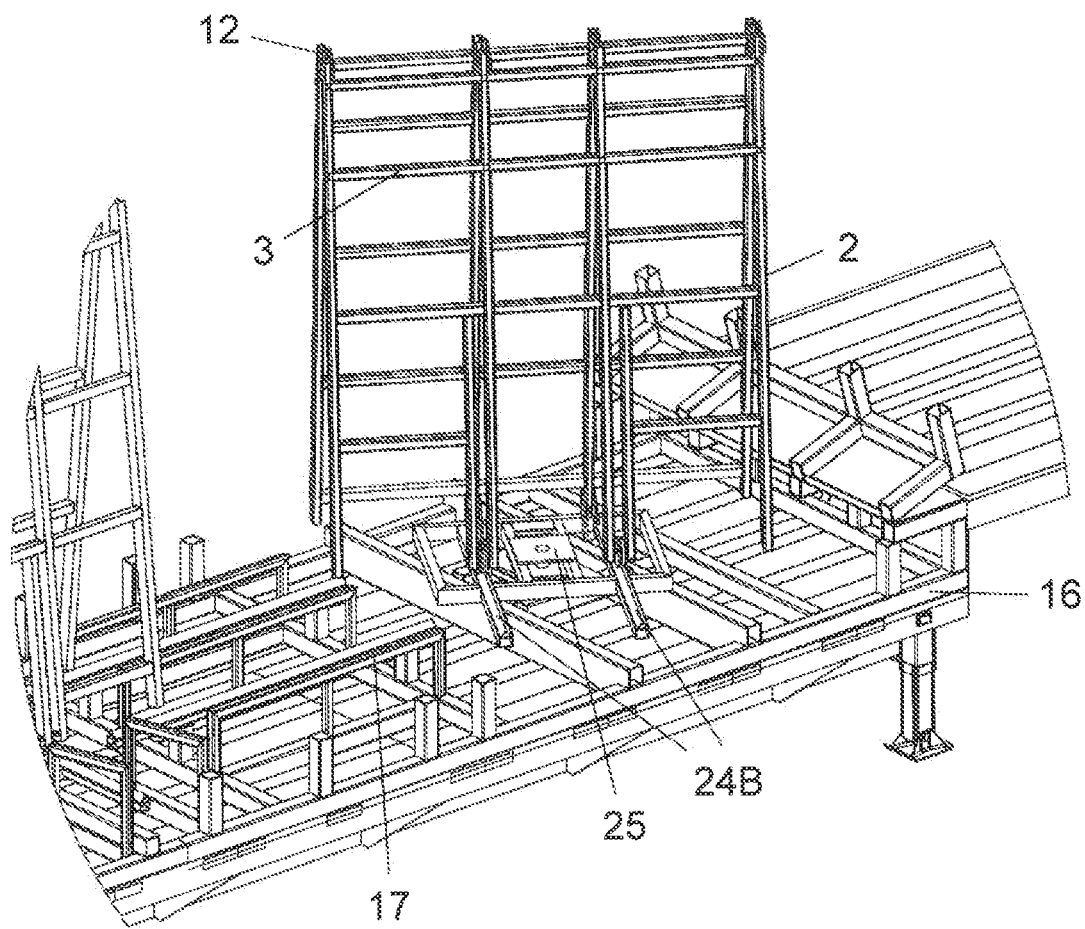
FIG. 6 illustrates the rotation sequence of the internal structure of the deployable rack wherein the cut-off or flat shape panels are attached.

In a preferred embodiment, the system as referred in FIG. 5b may be designed to supply more than one deployable rack, since the design comprises an arrangement with capacity for various deployable racks. Therefore, the system may comprise two turning transfer carts, wherein the turning platform (22) is comprised within the proximal and distal regions (18, 19) of the basal frame.

As referred in FIG. 4a, the turning point refers to the primary element of the platform allowing the deployable rack to perform a 90 degree turn on its axis in either clockwise or anti-clockwise direction, without exceeding the size permitted by local law and without violating transport regulations. Furthermore, the turning point allows the loading any goods, merchandise or raw material as loaded in a common transportation platform. Additionally, the turning point provides the deployable rack with versatility and mobility. The "turning point" (25) is located in the center of the turning platform (22) wherein a cylinder operates by manual, electrical, pneumatic and/or hydraulic forces activating a set of bearings, pins, gears, among others in order to achieve the turning force. Moreover, the turning platform and the turning point can be designed to be manufactured in hydraulic, mechanical, electromechanical, pneumatic, and manual versions.

The present disclosure relates to further elements such as security support elements (4, 20, 34) for belts or chains designed to ensure the support and fixation of the platform in either of the two phases, whether performing a storage mode or open mode. The design of the elements allows an easy use and function by operators. Furthermore, belts or chains can be used to achieve a safe and efficient fastening for this platform.

Figure 8A:
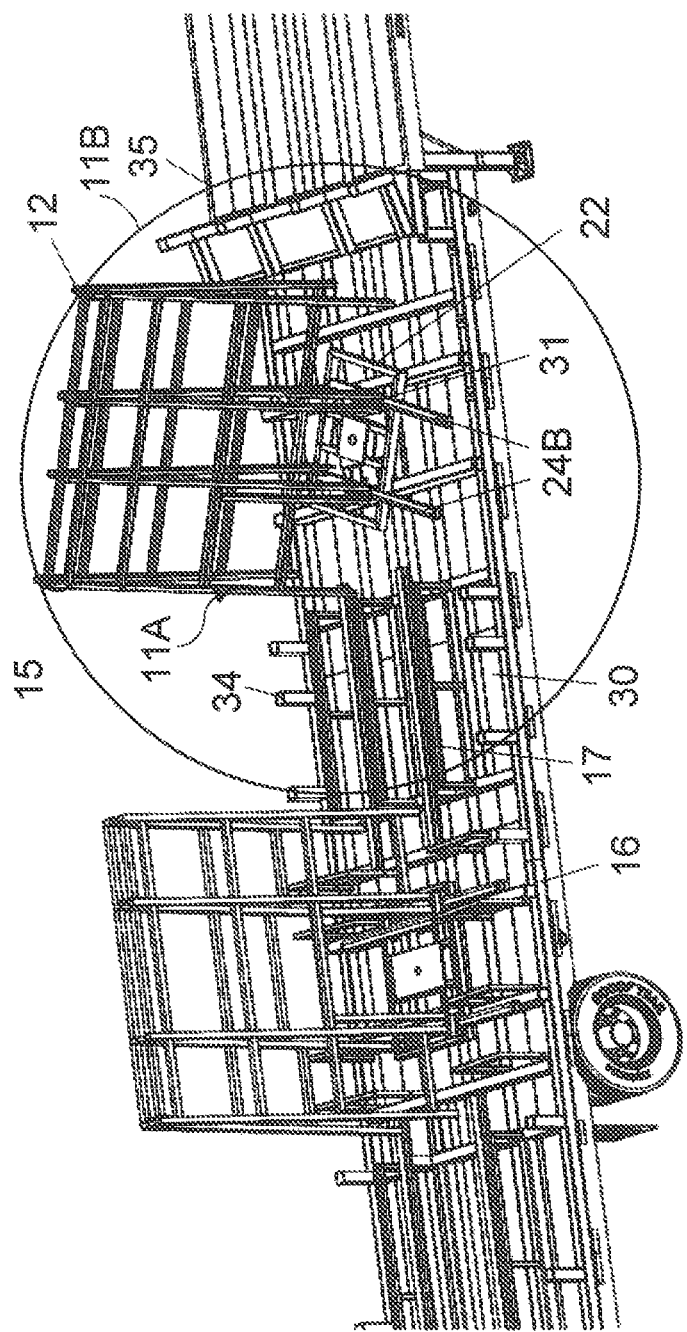
FIGS. 8a-h illustrate perspective views of the rotation sequence of the turning transfer cart on its own axis, in order to achieve alignment between the longitudinal center rails of the turning transfer cart and the longitudinal center rails of the basal frame.
Figure 8B:
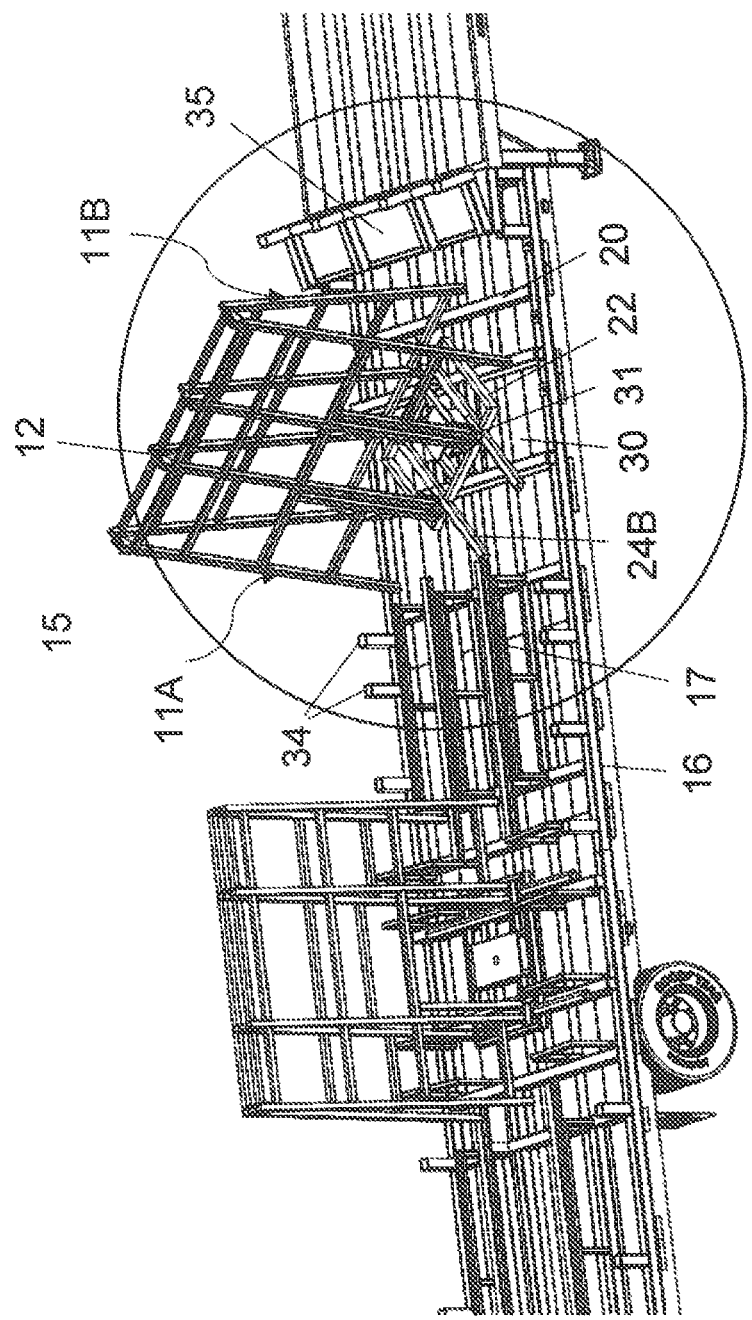
Figure 8C:
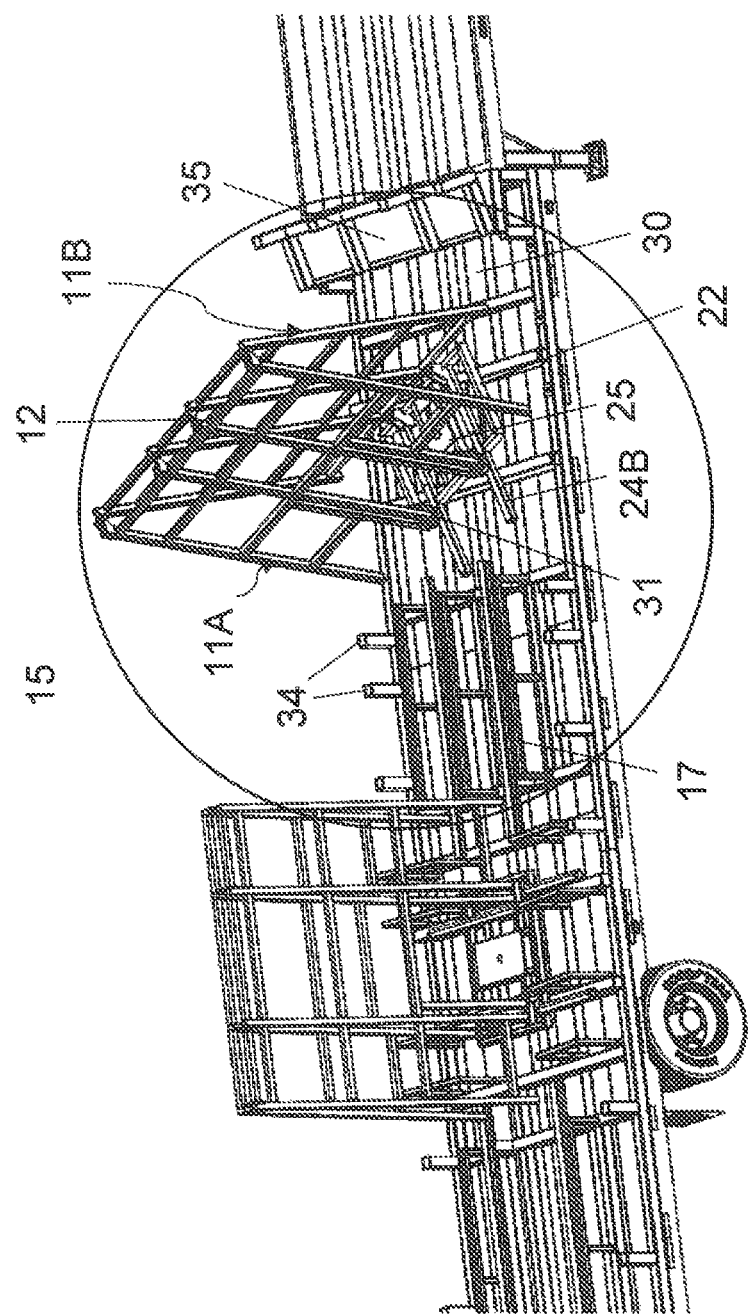
Figure 8D:
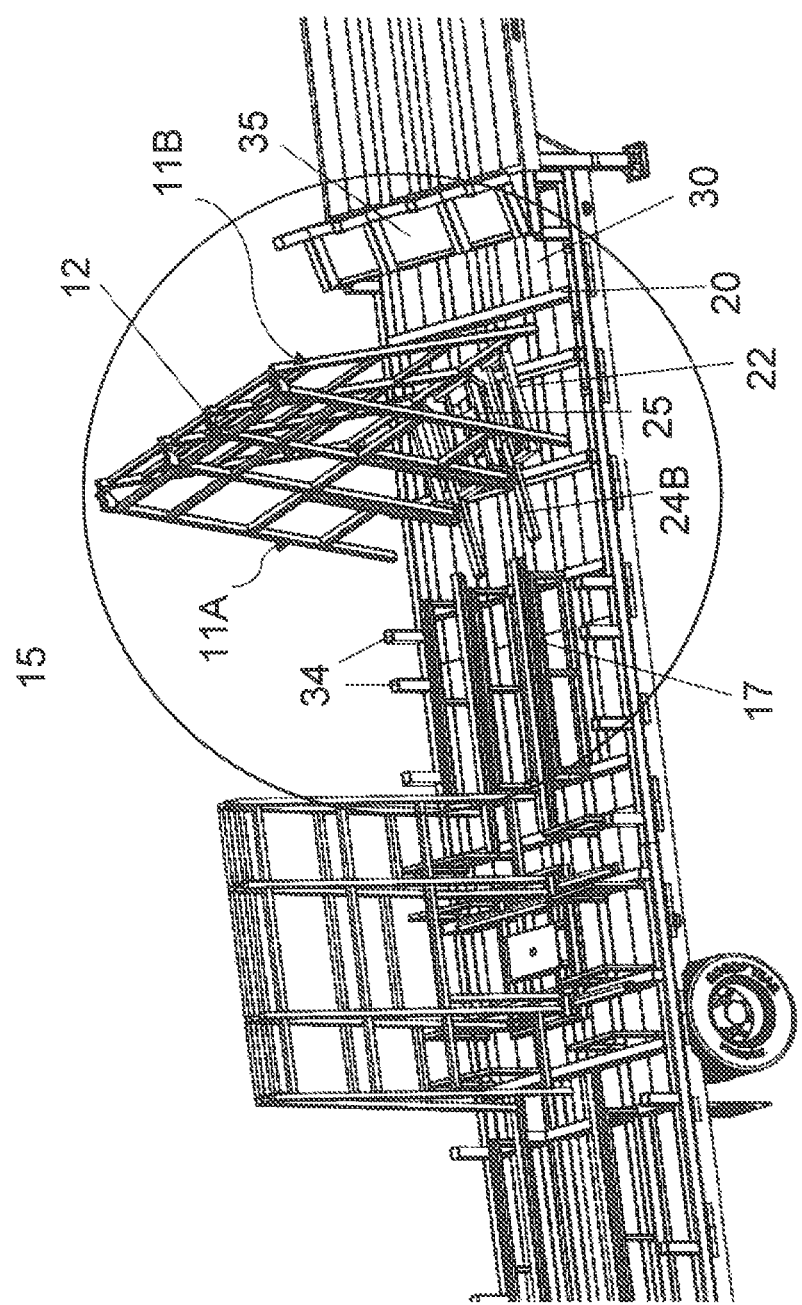
Figure 8E:
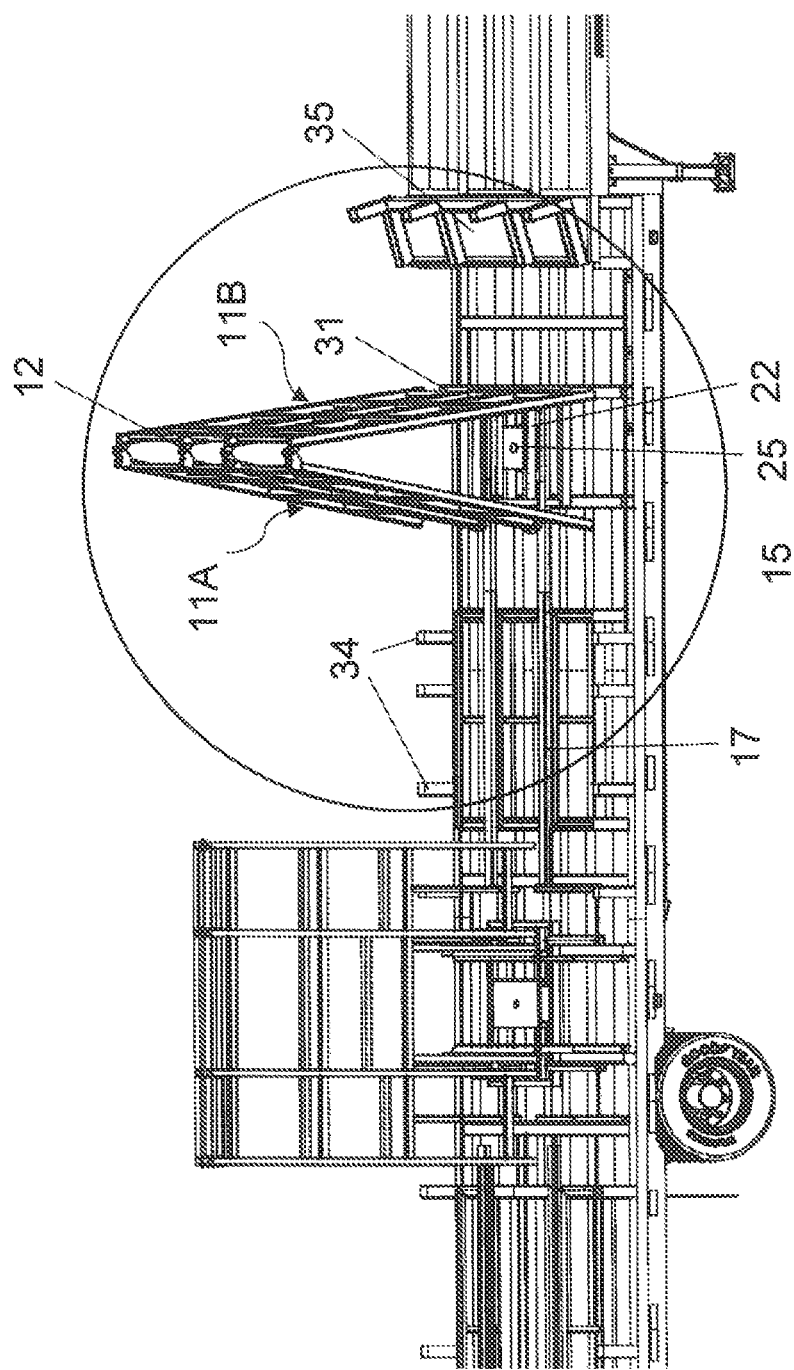
Figure 8F:
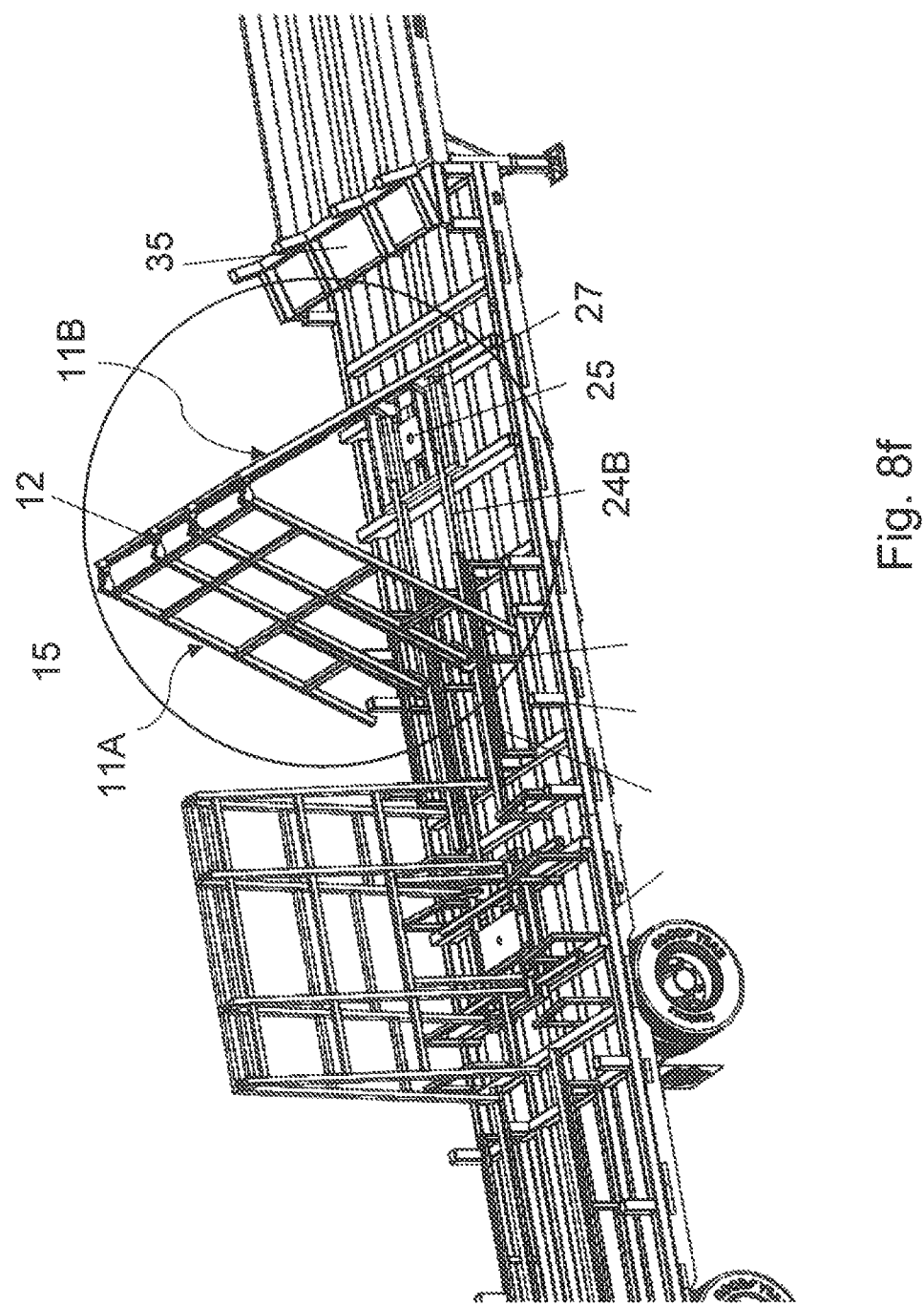
Figure 8G:
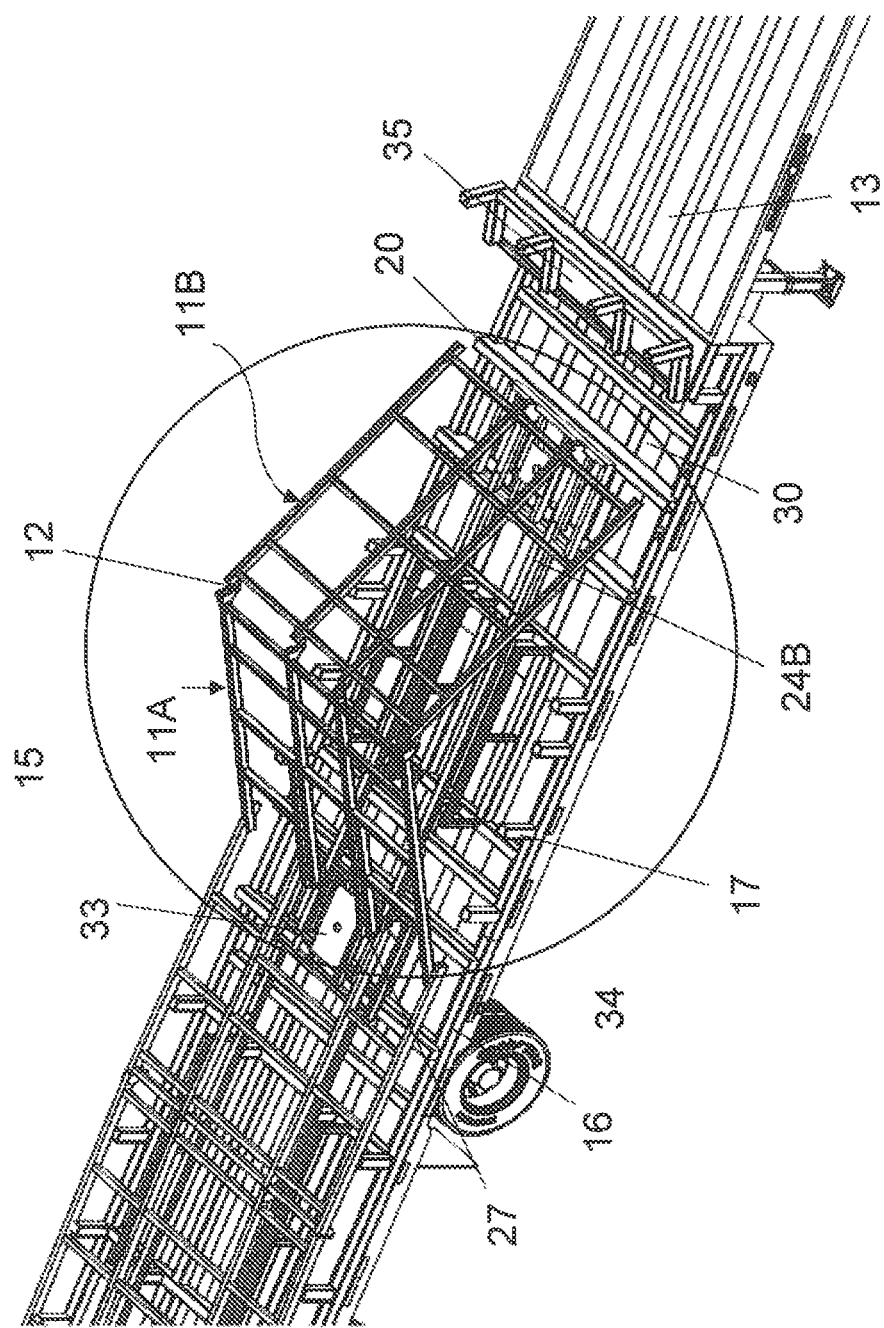
Figure 8H:
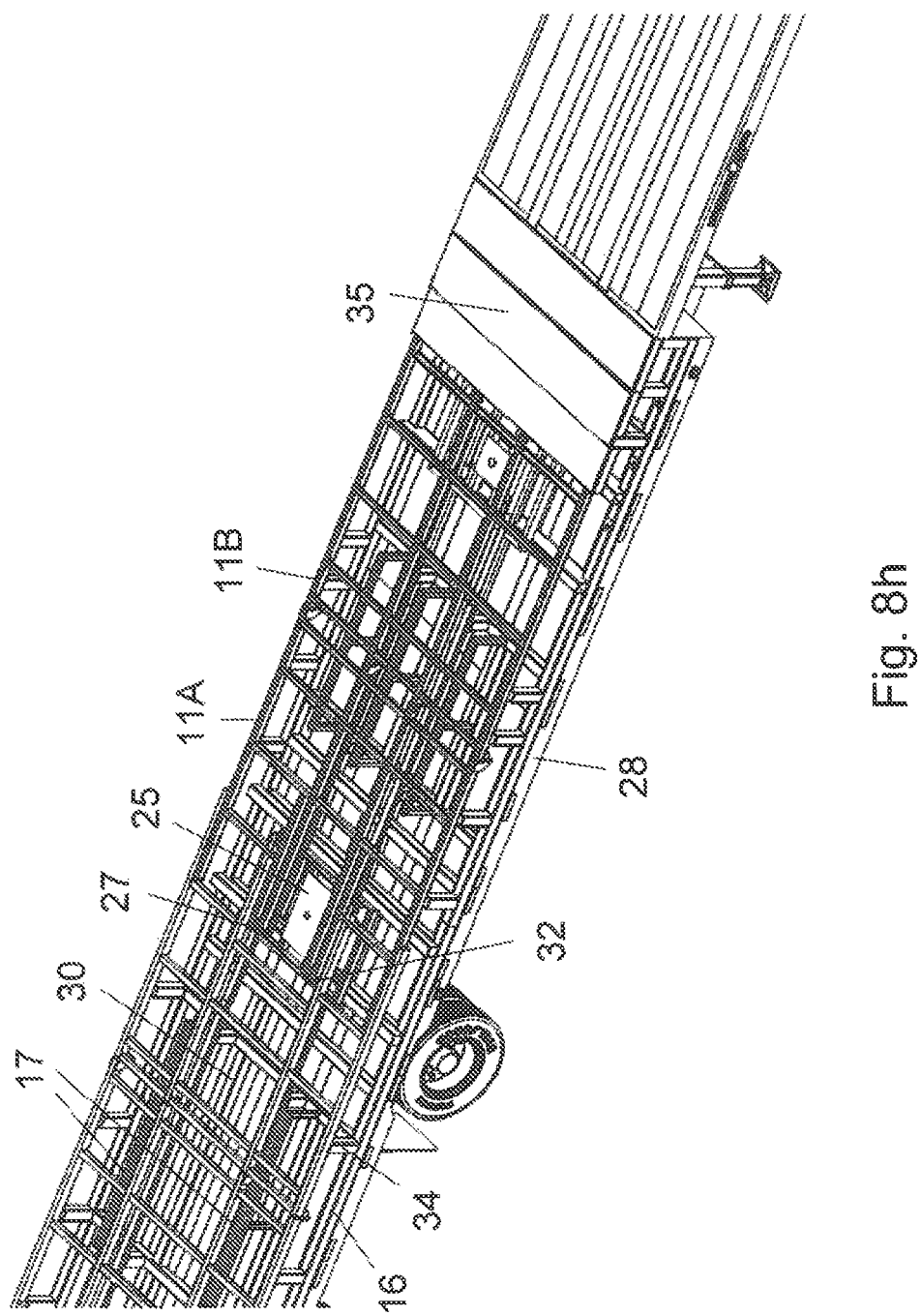

In a simplified embodiment, the invention comprises a deployable rack that in a first phase can transport flat glass and when deployed in a parallel mode with the original platform, the rack can approach the original technical features of an open loading platform (14) as illustrated in FIG. 8H; featuring a platform weight of 3,000 to 8,000 pounds, but the loading area across the original platform will be the same.

In an illustrative embodiment of the invention, the flat platform or phase 1 (storage mode) as illustrated in FIG. 8h, aids in the transportation of any goods, merchandise or raw material as referred in the original phase of the open mode (phase 2) (14), wherein the basal frame is located in the top of the platform, which also comprises the turning platform embedded within the turning frame. The turning platform is attached to the internal structure of the deployable rack (1) along with the rack panels (11a, 11b) which are joined by the panel union hinge (12). At this time, the longitudinal rails of both the turning transfer cart and the basal frame (17, 24a, 24b) are perfectly aligned in order that the sliding rollers (32) may run through the rails formed by the longitudinal rails of the turning transfer cart platform and the central rails of the basal frame and wherein the union hinge allows the gradual opening of their angle.

Figure 7B:
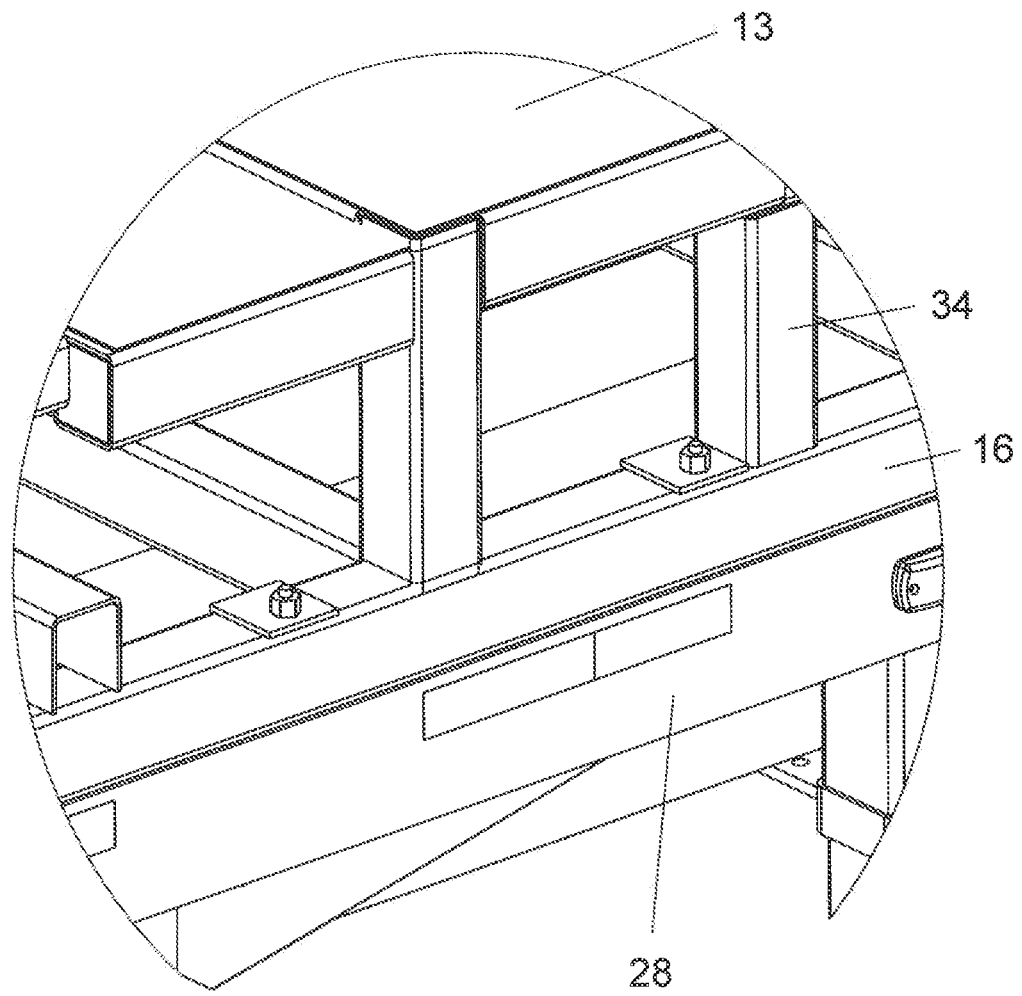
FIG. 7b, illustrates the uniform panel located above the basal frame or basal platform.

Furthermore, the internal structure of the deployable rack (1) and the panels (11a, 11b) as referred in FIG. 5a, start their folding operation until lifting the rack and closing their angle until achieving a safe inclination of each sheet within a period not exceeding 5 minutes. Then, the turning transfer cart performs a 90° turning movement on its own axis until achieving a transverse position with the basal frame (16), and the loading of flat material such as glass, metal sheets or wooden sheets starts. At this point, the load of material and the rack angle are ensured by removable components in the "horseshoe-shaped" form (4) as referred in FIG. 5a, which are located on the edges and along the deployable rack. The configuration of the basal frame allows the removable components to be located as desired by the operator. As referred in FIG. 7b, the aforementioned embodiment refers to the second phase (open mode-2) which serves for the transport of flat glass, metal sheets or plywood or wood sheets. In the aforementioned embodiment, the deployable rack is in open mode forming an inverted "V" shape, as illustrated in FIG. 1b. The aforementioned system guarantees a load capacity up to 20 Tons. Furthermore, the holding and securing devices located in the supporting walls of the rack for fastening the glass sheets are elements of the basal frame which is affixed on the chassis platform.

Then, the platform returns to Phase 1 (storage mode), for the loading and transportation of several materials from the second folded position. Moreover, the unloading of material starts when the turning transfer cart performs a 90 degree turn on its own axis until achieving a parallel position with the basal frame. Furthermore, when the central rails of the turning transfer cart (17, 24a, 24b) and the central rails of the frame achieve an alignment, the two (panels) sheets of the deployable rack in a folded position increase their opening angle by translating of one of the panel sheets along the longitudinal rails of the basal frame until achieving a completely flat position, being parallel to axis "y", as illustrated in FIGS. 8a-8h.

Subject to a preferred embodiment of the platform, the disclosure refers to several configurations of the platform such as;

Different options for lifting and unfolding the deployable rack,
    construction materials,
    different lengths and heights of the deployable rack,
    diverse alternatives for the rack rotations, and
    obtaining a flat surface that is as close as possible to the original conditions of the open mode platform as referred in FIG. 7H; sacrificing the minimum possible weight to be used for loading goods, merchandise or raw material and thus, maximizing the profit of the operator. The embodiment chosen according to the customer's preference in each performance of the platform shall directly affect the manufacturing cost of the rack and its materials.

REFERENCE NUMERALS

1—Internal structure of the deployable rack
2—longitudinal reinforcement axes of the panel support structure
3—longitudinal transversal axes of the panel support structure
4—Removable support component
10—Chassis platform in open mode
11A—distal panel
11B—Proximal panel
12—union hinge
13—drive pinion
14—Chassis platform in open mode
15—Deployable rack
16—basal frame
17—longitudinal frame rails
18—proximal region of the basal frame
19—distal region of the basal frame featuring a space within the turning transfer cart
20—transverse support rails of the basal frame
21—longitudinal support rails of the basal frame
22—turning transfer cart
23—support structure of the turning transfer cart
24A—internal longitudinal rails of the turning transfer cart
24B—external longitudinal rails of the turning transfer cart
25—turning point
26—turning point axis
27—hinges
28—chassis of a transportation vehicle
29—fastening structure
30—upper part of the chassis
31—intersection points of the hinges
32—translation mechanism
33—support sheet of the distal panel
34—support elements
35—loading area This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art.

The invention claimed is:

1. A rotating and pivoting deployment rack system located on a loading platform of a transportation vehicle for transporting objects comprising:
a basal frame having longitudinal and transverse rails mounted on a chassis of said transportation vehicle;
at least one turning transfer cart having internal longitudinal rails, external longitudinal rails, a turning point, and a support structure so that said at least one turning transfer cart is mounted on said basal frame and rotates 90° about said turning point between a clockwise direction and a counter clockwise direction so that said external longitudinal rails of said at least one turning transfer cart rotate between being parallel to said longitudinal rails and said transverse rails of said basal frame;
at least one deployment rack comprising:
a flat panel attached to said at least one turning transfer cart;
a trimmed panel pivotally connected to said flat panel by a union hinge so that said trimmed panel is configured to pivot between an upright folded inverted V shaped position and a horizonal flat position in relation to said flat panel so that said trimmed panel and said flat panel are unfolded in opposite directions away from each other, and when said at least one deployment rack is in said inverted V position, said at least one deployment rack is configured to transport flat sheet objects, and when all of said at least one deployment rack is in said flat horizontal position, all of said loading platform of said transportation vehicle is flat while also configured to transport said at least one deployment rack.

2. The rotating and pivoting deployment rack system of claim 1 wherein said flat sheet objects comprises at least one of flat glass, metal sheets, plywood, or lumber.

3. The rotating and pivoting deployment rack system of claim 1 wherein said flat sheet objects is at least one pane of glass.

4. The rotating and pivoting deployment rack system of claim 1 further comprising at least one removable support component having a horseshoe shape and positioned between said basal frame and said at least one deployment rack so that said at least one deployment rack is configured to maintain said inverted V position and wherein said removable support component supports a weight of said flat sheet objects.

5. A method of assembling a rotating and pivoting deployment rack system located on a loading platform of a transportation vehicle for transporting objects comprising:
mounting a basal frame having longitudinal and transverse rails mounted on a chassis of said transportation vehicle;
rotatably attaching at least one turning transfer cart to said basal frame so that said at least one turning transfer cart rotates 90° between a clockwise direction and a counter clockwise direction;
securing internal longitudinal rails, external longitudinal rails, and a turning point to a support structure defining said at least one turning transfer cart so that said turning point is the axis of rotation for said at least one turning transfer cart;
attaching a flat panel to said at least one turning transfer cart;
pivotally connecting a trimmed panel to said flat panel by attaching a union hinge to said trimmed panel and to said flat panel so that said trimmed panel pivots between a horizontal flat position away from said flat panel, and an upright folded inverted V shaped position towards said flat panel so that when said at least one deployment rack is in said inverted V position, said at least one deployment rack transports flat sheet objects, and when all of said at least one deployment rack is in said flat horizontal position, all of said loading platform of said transportation vehicle is flat while transporting said at least one deployment rack.

* * * * *